3,003,918
PRODUCTION OF CERULOPLASMIN IN A PURIFIED STATE FROM BLOOD PLASMA FRACTIONS
Benjamin E. Sanders and Maurel N. Richard, North Wales, and Orin P. Miller, Broomall, Pa., assignors to Merck & Co., Inc., Rahway, N.J., a corporation of New Jersey
Filed Oct. 17, 1958, Ser. No. 767,830
3 Claims. (Cl. 167—74)

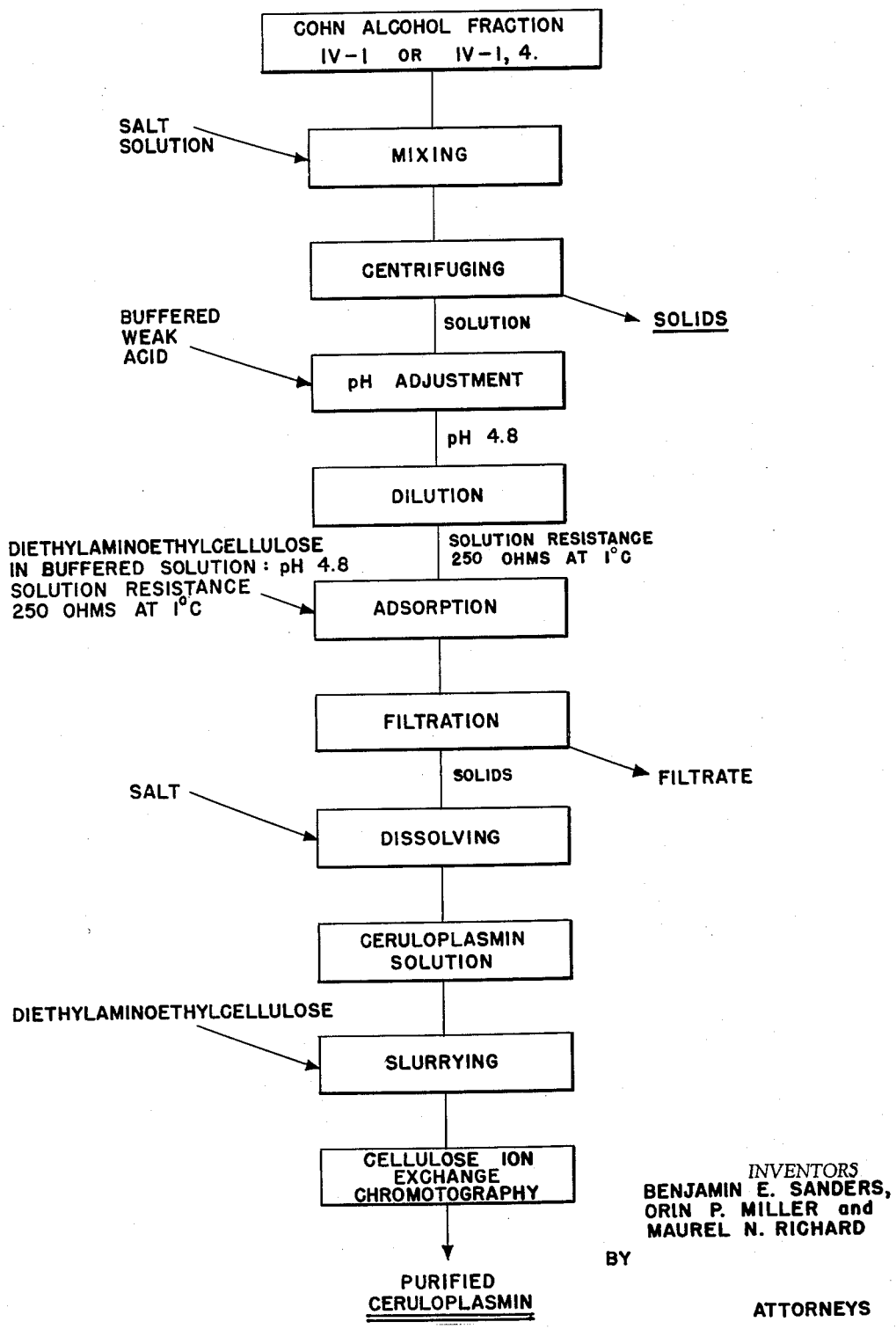

This invention relates to the preparation of ceruloplasmin from a plasma protein fraction containing mixtures of proteins. Preferred starting materials are selected from the group consisting of Cohn alcohol fraction IV–1 and Cohn alcohol fraction IV–1, 4.

It has heretofore been known that ceruloplasmin, which is a protein having a characteristic blue color, may be isolated from blood plasma. This fact has been reported by Holmberg and Laurell, Acta. Chem. Scand. 2: 550 (1948). It is also known that ceruloplasmin is present in fraction IV prepared by the well-known Cohn cold ethanol fractionation procedure. It has also been noted that a blue zone appears on a diethylaminoethylcellulose during fractionation of human serum; J. Am. Chem. Soc. 78: 756 (1956).

Ceruloplasmin is normally present in human and animal blood in fairly constant amounts. However, the concentration of this blue alpha globulin rises during infection and pregnancy. A deficiency of it is thought to be involved in Wilson's disease, and ceruloplasmin preparations have been used recently in treating schizophrenic patients.

It is an object of this invention to provide a new method of producing ceruloplasmin from a Cohn alcohol fraction, with high yield and in a pure form. Another object is to provide a more efficient and cenvenient method of obtaining substantial production quantities of highly pure ceruloplasmin.

Referring to the drawing, a flow diagram is presented which outlines the preferred steps of the process. The drawing is not, however, intended to limit the scope of the invention. As will later become apparent, some of the steps shown in the drawing may be omitted in some cases, and others reversed in order.

In accordance with the method of this invention, ceruloplasmin is purified from a blood protein mixture containing ceruloplasmin and at least one other blood protein. Suitable starting materials include either Cohn alcohol fraction IV–1 or Cohn alcohol fraction IV–1, 4, which are referred to in J. Am. Chem. Soc. 68: 459 (1946).

Although both such Cohn fractions contain many unknown components, the known components, and their approximate proportions, are given in the following table, based on one liter of blood plasma:

COHN FRACTION IV–1

[8% by wt. of total plasma protein]

| | Approx. wt., gms. |
|---|---|
| α-Lipoproteins | 2 |
| (About 1–4% by wt.) ceruloplasmin | .1–.2 |
| Albumin | .7 |
| Other α–2 globulins | 1 |
| Traces of other enzymes | — |
| Total | About 4 |

COHN FRACTION IV–1,4

[15% by wt. of total plasma protein]

| | Approx. wt., gms. |
|---|---|
| α-Lipoproteins | 2½ |
| Iron-binding globulin | .2½ |
| (About ½–2% by wt.) ceruloplasmin | .1–.2 |
| Albumin | 1 |
| Muco-proteins, glyco-proteins | 1 |
| Hypertensinogen | Below .1% |
| Coline esterase | Below .1% |
| Other enzymes | Below .1% |
| Other α-2 globulins | 2 |
| Total | About 9 |

The preferred starting material, Cohn fraction IV–1 or IV–1, 4, is a greenish paste containing alcohol. It is maintained at a temperature below 4° C., preferably below 2° C., and stirred at that temperature with a cold salt solution, the concentration of which may be varied within wide limits so long as the ceruloplasmin content is brought into aqueous suspension in the solution. While sodium chloride is the preferred salt for this purpose, wide varieties of other ionic salts may be substituted. Many proteins which are insoluble in the salt are separated from the ceruloplasmin which goes into suspension.

The suspension is then centrifuged, removing solids from the ceruloplasmin-containing suspension or solution. The pH of the suspension is then adjusted to a value of above about 4.6, preferably about 4.6 to 5. This is preferably accomplished by adding a sodium chloride-sodium acetate-acetic acid solution. The optimum pH is 4.8.

However, the pH adjustment may precede the centrifuging step if desired.

After adjustment of the pH, the solution is diluted out, if necessary, also reducing the electric conductivity of the solution. The specific resistance of the solution varies considerably with temperature, and is conveniently measured at 22° C. When measured at 22° C., the resistance should be above about 160 ohms, in a 1 cm. path. When measured at about 1° C., such solution has a resistance above approximately 200 ohms in a 1 cm. path (specific resistance). A solution of sodium chloride which is approximately .05 molar as to NaCl is highly efficient. The temperature of the solution may be permitted to vary within limits, such as 0 to 4° C. Some alcohol is still present in the solution.

In a separate container, a purified form of diethylaminoethylcellulose is suspended in a sodium chloride-acetate buffer solution having about the same pH and ionic strength as the ceruloplasmin solution, preferably about 4.8. The two solutions are then agitated together, with the result that the ceruloplasmin is adsorbed on the diethylaminoethylcellulose. The nature of the binding is not completely understood, but it is clear that the diethylaminoethylcellulose adsorbs several proteins but leaves behind the great majority.

According to the invention, the resulting suspension containing ceruloplasmin is then filtered and washed, preferably with the same solution. This wash solution may contain, for example, .025 mole of NaCl per liter and .005 mole of sodium acetate per liter. A second wash, using .05 mole of NaCl per liter and .01 mole of acetate buffer is useful and provides a product of higher purity. After filtration, the ceruloplasmin is dissolved off the diethylaminoethylcellulose by raising the salt concentration to a value above .15 molar sodium chloride, thereby producing a solution containing ceruloplasmin having a purity of about 50% to 90% and above.

To purify the ceruloplasmin further, the resulting solution is slurried with diethylaminoethylcellulose in a solution which is approximately .06 molar NaCl, over an ion exchange column, using the technique known in the art as cellulose ion exchange chromatography. In accordance with this process, the column is adjusted to the proper pH and molarity of buffer, and the material allowed to settle in the column (preferably glass). The column is desirably fitted with a coarse sintered glass bottom and an adjustable valve at its bottom. It is preferably operated under flow conditions induced by gravity alone.

Columns prepared in this manner possess the ability to hold the buffer level at the top of the adsorbent against the pull of gravity. Preferably the volume of the lower part of the column is at least twice the volume of the upper part, which contains the ceruloplasmin. Ceruloplasmin is obtained by elution with salt gradient increasing the concentration of sodium chloride. Fractions are collected in this manner, preserving the fraction which is rich in ceruloplasmin of high purity. Following this technique, ceruloplasmin as pure as 98% to 100% can be obtained.

The eluates from the column may be concentrated by re-adsorption on a new diethylaminoethylcellulose column, and eluted with 0.14 molar sodium chloride and 0.01 acetate buffer, for example. This provides a frontal elution and concentrates the ceruloplasmin. On the other hand, an alcohol precipitation step may be used either for simple concentration or for purification since some impurities are more soluble in cold 15% ethanol than is ceruloplasmin. In alcohol precipitation an ionic strength of approximately 0.1, for example, is recommended, since ceruloplasmin may not precipitate if the ionic strength is either too high or too low.

It is important to observe that the preliminary batch operation, as reported above, is necessary with highly impure starting materials before going to the column operation. When unstable proteins other than ceruloplasmin are present in high percentages, precipitating fatty material can cause complete blocking of a column.

In addition to its other advantages as heretofore discussed, the method according to this invention also avoids the necessity of known denaturing steps, and can give ceruloplasmin with purity from 90% to 100%.

This invention is further illustrated by the following specific example:

Example

Cohn fraction IV–1 paste was extracted with five volumns of 0.06–0.1 molar sodium chloride through gentle mixing followed by centrifugation. The extract was adjusted to pH 4.8 and diluted to a resistance of above 250 ohms at 1° C. The diethylaminoethylcellulose equilibrated with pH 4.8 acetate buffer (0.01 molar) containing 0.05 molar sodium chloride, was added with stirring. The dry weight of exchanger required in the case of a very impure ceruloplasmin extract should equal about the weight of protein present. The suspension was stirred and the diethylaminoethylcellulose holding the ceruloplasmin was filtered off on cheesecloth. The diethylaminoethylcellulose was washed with the pH 4.8 acetate buffer, diluted to an equal volume of distilled water, until optical density reading at 280 millimicrons fell below 0.200.

The ceruloplasmin was eluted at this point with 0.15 molar sodium chloride giving a ceruloplasmin solution of from 60% to 90% purity. The diethylaminoethylcellulose holding the ceruloplasmin was also slurried over additional equilibrated diethylaminoethylcellulose to form a column and the protein eluted by salt gradient. Using an increase of 0.005 molar every column volume, the ceruloplasmin was eluted between 0.07 and 0.12 molar, and was secured in better than 90% purity. The cellulose was at a constant pH with 0.01 molar acetate buffer at a pH of 4.8, throughout the procedure.

The diethylaminoethylcellulose used was given two regenerations and left on the acid side. It was washed free of salt and equilibrated to the desired pH and ionic strength.

Although we have disclosed this invention with reference to certain specific embodiments thereof, it will be appreciated that various changes may be made without departing from the spirit and scope of this invention, such changes including the substitution of equivalent chemicals and method steps, reversals of method steps, the substitution of equivalent materials and equipment, and the use of certain features independently of other features, all as defined in the appended claims.

Having thus described our invention, we claim:

1. In a method of producing ceruloplasmin from a protein fraction selected from the group consisting of Cohn alcohol fractions IV–1 and IV–1, 4, the steps which comprise stirring said fraction with an alkali metal chloride solution, centrifuging to separate the insoluble materials from the resulting ceruloplasmin containing suspension, adjusting the pH of the resulting ceruloplasmin suspension to about 4.6 to 5, adjusting the specific electrical resistance of the suspension to a value above about 250 ohms at about 0 to 4° C., suspending diethylaminoethylcellulose in a solution of alkali metal chloride and acetate, said solution having a pH of about 4.6 to 5 and having an alkali metal chloride molarity of at least about 0.025 M, mixing the solutions together causing adsorption of said ceruloplasmin on said diethylaminoethylcellulose, filtering the solution from the resulting solids, and eluting the resulting ceruloplasmin from the diethylaminoethylcellulose by increasing the molar concentration of said alkali metal chloride.

2. In a method of producing ceruloplasmin from a protein fraction selected from the group consisting of Cohn alcohol fractions IV–1 and IV–1, 4, the steps which comprise stirring said fraction with an aqueous sodium chloride solution, separating the insoluble materials from the resulting aqueous suspension, adjusting the pH of the resulting ceruloplasmin suspension to above about 4.6, adjusting the specific electrical resistance of the suspension to a value above about 160 ohms at about 22° C., suspending diethylaminoethylcellulose in a buffered sodium chloride-acetate solution having a pH which is about equal to the pH of said ceruloplasmin suspension and having a sodium chloride molarity of at least about 0.025 M, mixing the solutions together causing adsorption of said ceruloplasmin on said diethylaminoethylcellulose, separating the solution from the resulting solids, washing said solids with said buffered salt solution, and raising the salt concentration above about 0.15 molar NaCl thereby dissolving the ceruloplasmin away from the diethylaminoethylcellulose.

3. In a method of producing ceruloplasmin from a protein fraction selected from the group consisting of Cohn alcohol fraction from IV–1 and Cohn alcohol fraction IV–1, 4, the steps which comprise stirring said Cohn alcohol fraction with a compatible ionic salt solution, separating the insoluble materials from the resulting suspension, adjusting the pH of the resulting ceruloplasmin suspension to above about 4.6, adjusting the specific electrical resistance of the suspension to a value above about 250 ohms at about 0 to 4° C., suspending diethylaminoethylcellulose in a buffered salt solution having a pH which is about equal to the pH of said ceruloplasmin suspension, mixing the solutions together at about 0 to 4° C. causing adsorption of said ceruloplasmin on said diethylaminoethylcellulose, separating the solution from the resulting solids, slurrying said solids in a dilute NaCl solution having a sodium chloride molarity of at least about 0.025 M in a diethylaminoethylcellulose ion exchange column, eluting ceruloplasmin fractionally by increasing the concentration of NaCl in the solution.

References Cited in the file of this patent

Holmberg: Acta Chemica Scand., vol. 2, 1948, pp. 550–556.

Cohn: JACS, vol. 68, 1946, page 459.
Sobel: JACS, vol. 78, 1956, pages 754–763.
Science, 126: 3279, Nov. 1, 1957, pages 925–926.
Heath: Am. J. Psych., vol. 114, February 1958, pp. 683–689.